July 22, 1969   C. A. DAWSON   3,456,316
DOUBLE-LAND END MILLS

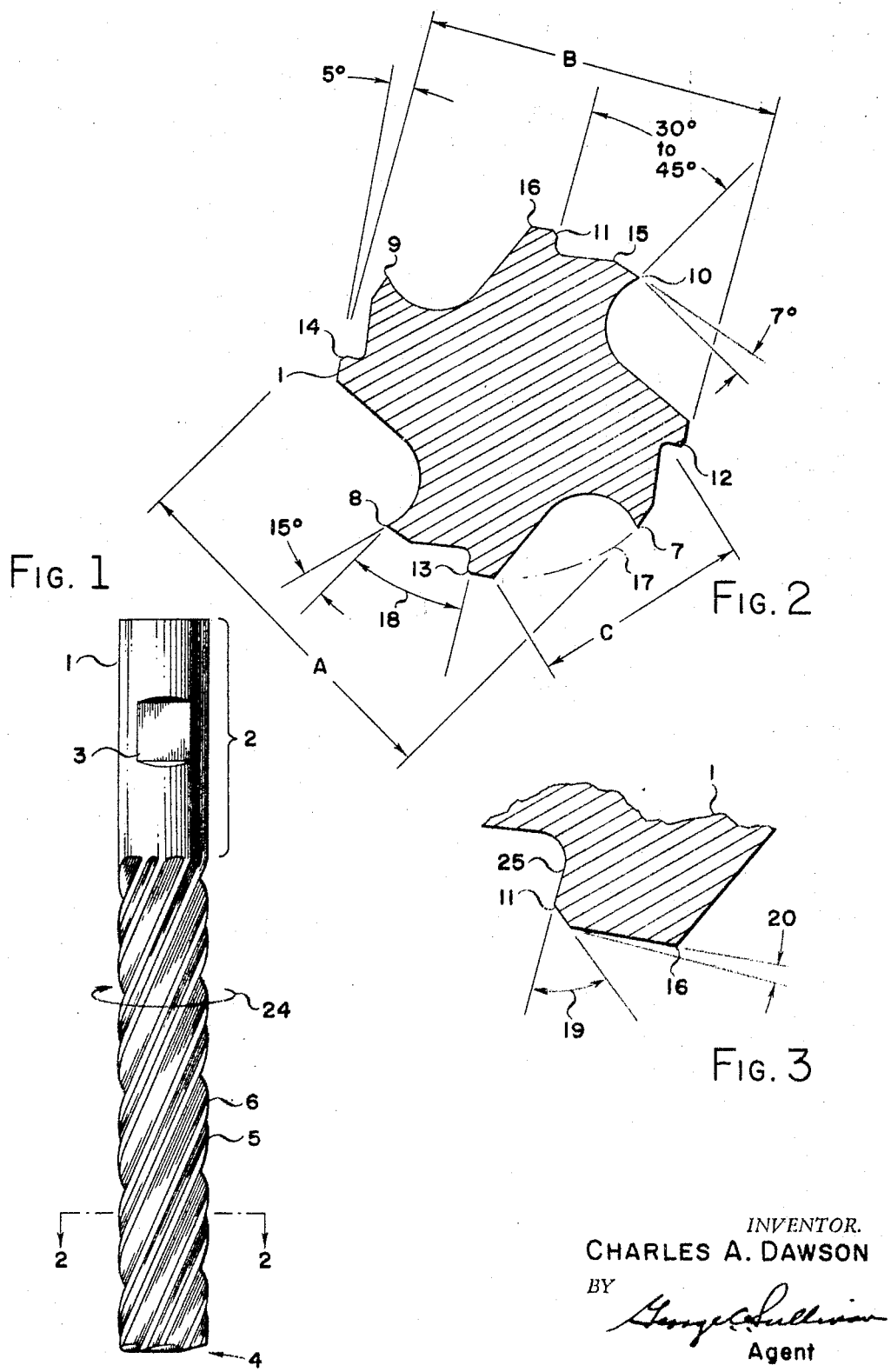

Filed Aug. 31, 1967   2 Sheets-Sheet 2

INVENTOR.
CHARLES A. DAWSON
BY
Agent

United States Patent Office 3,456,316
Patented July 22, 1969

3,456,316
DOUBLE-LAND END MILLS
Charles A. Dawson, Sun Valley, Calif., assignor to Lockheed Aircraft Corporation, Burbank, Calif.
Filed Aug. 31, 1967, Ser. No. 664,659
Int. Cl. B23p *15/34*
U.S. Cl. 29—103           8 Claims

ABSTRACT OF THE DISCLOSURE

A rotary cutting tool of the fluted end mill type is provided which is capable of improving the accuracy and finish of the cut surface of the workpiece. A plurality of non-cutting lands are helically disposed along the longitudinal axis of the tool between the cutting lands. The non-cutting lands have a radial dimension slightly smaller than the radial dimension of the cutting lands and serve as guiding edges which stabilize the shank by limiting the amount of possible deflection. By minimizing cyclical deflections of the tool with respect to the workpiece, a smoother, more accurately finished, surface will result.

Background of the invention

Various types of rotary cutting tools have been developed heretofore for the removal of metal by a shearing action whereby a continuous chip or chips are formed. An end mill is typical of such rotary tools. A shortcoming of prior end mills and like rotary tools is that they have a tendency to cyclically deflect under load resulting in an uneven cut. This rhythmic flexing or "chatter" of the tool against the workpiece causes a ripple pattern to be formed on the milled surface, and also results in an undercutting of the surface. Attempts have been made heretofore to overcome this shortcoming by increasing the number of flutes on the tool. This results in a closer spacing of the ripples on the milled surface and a desirable reduction in the ripple amplitude (at the expense of a greater torque load on the tool and its prime mover) but does not in fact eliminate the problem. Other attempts to overcome the problem involve the use of lower spindle speeds, lighter cuts, more rigid shanks, and high modulus shank materials such as tungsten carbide. Lower spindle speeds and light cuts adversely reduce productivity. Increasing the rigidity of the shank tends to undesirably reduce the chip clearance. Carbide shanks are costly and susceptible to breakage. Hand finishing of the rough surface produced by tools of the prior art is a last resort and is extremely expensive.

Brief summary of the invention

The present invention overcomes the above-noted shortcomings by means of a double-land rotary tool of novel construction which stabilizes the location of the tool's circumferential cutting path with respect to the surface of the workpiece. For all practical purposes, the present invention eliminates the cyclical vibration characteristic of prior art end mills. Stabilization of the cutting path is accomplished by the interposition of a non-cutting land between the cutting edges of the tool. Thus, immediately following a cutting action by the cutting edge of the tool, the non-cutting land will engage the workpiece if there is a tendency for the tool axis to deflect towards the workpiece and thereby limit any such deflection. In this way, the non-cutting land acts as a "bumper" which clears the cut in the forward cutting direction when the shank is not deflected, but which will strike the workpiece in response to any tendency of the tool to spring towards the cut surface. The novel geometry of the non-cutting lands with respect to the cutting lands achieves this stabilizing effect on an essentially continuous basis.

In a preferred embodiment the invention is designed for finish cutting and permits the use of spindle speeds higher than those heretofore considered practical.

It is therefore an object of the invention to provide a novel and improved rotary cutter having a stabilizing land disposed along the major axis of the tool, axially coextensive with the cutting edge, to improve the dynamic stability of the tool.

Another object of the invention is to provide a novel and improved rotary cutting tool capable of providing a smoother and more accurate cut than that provided for by prior devices intended to accomplish a generally similar function.

Still another object of the invention is to provide a novel and improved double-land end mill for producing a uniform surface finish.

Yet another object of the invention is to provide an end mill which minimizes undercutting and which may be driven at higher spindle speeds than may be used with generally similar devices employed heretofore.

Other objects and a fuller understanding of the invention may be had by referring to the following description and claims, taken in conjunction with the accompanying drawings.

Brief description of the views of the drawings

FIGURE 1 is a side view of a double-land end mill constructed in accordance with the invention;

FIGURE 2 is a cross-sectional view of the cutting portion of the device of FIGURE 1, taken along line 2—2;

FIGURE 3 is an enlarged detail view, illustrating a portion of the device of FIGURES 1 and 2;

Detailed description

Figure 4:
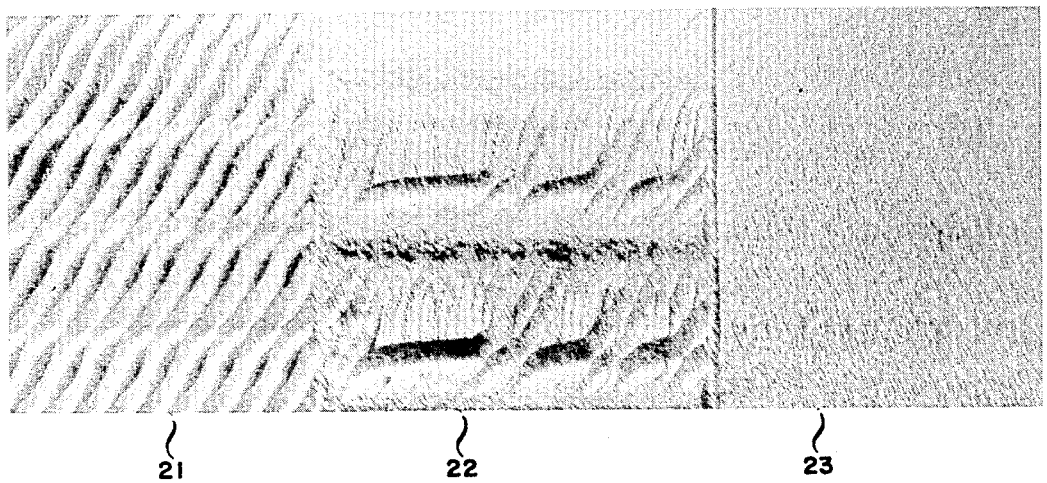
FIGURE 4 is a photomacrograph of a workpiece illustrating the milled surface produced by prior art cutters as compared with the milled surface produced by a cutter constructed in accordance with the present invention.

Referring to FIGURE 1, there is shown a four-flute end mill 1, constructed in accordance with the invention, having an end portion 2 adapted to engage the spindle of a milling machine. A flat 3 is provided on end portion 2 for the non-rotative securement of the tool to the spindle. The depending end portion 4 of the tool comprises the cutting portion. End cutting teeth of conventional design may be provided at the lower terminus of end portion 4. A typical one of the four flutes having a cutting edge thereon is shown at 5. The flutes extend helically along the cutting end portion 4. One of the four helical lands having a guiding edge thereon is shown at 6.

As can be seen in the embodiment of FIGURE 2, there are four cutting edges (7–10) and four guiding edges (11–14) radially disposed about the major axis of the end mill 1. Inasmuch as the four cutting edges are alike, only a typical one will be described in detail. The cutting edge is formed at the vertex of the front face and the back face of land 5, and in accordance with usual practice a clearance angle is applied to the back face. In the embodiment shown a 7° radial relief is provided between cutting edge 10 and trailing edge 15. Typically this angular clearance may have a tolerance of ±1°. A 5°±1° radial relief is provided between guiding edge 11 and trailing edge 16. For convenience in manufacture, this angle may be changed to 7° in order to conform to the clearance angle of the cutting land. The circumferential cutting path of cutting edges 7–10 is indicated at 17 and has a diameter A. The radial displacement between each cutting edge and its associated trailing guiding edge is indicated as angle 18 and is typically 30° to 45°. There is a positive radial rake angle of the cutting edge which typically may be 15°. The diameter of the path traced by the guiding edges 11–14 is identified as diameter B and is slightly smaller than diameter A. The root diameter is identified as diameter C.

As can be seen in FIGURE 2, there are provided clearing grooves between the cutting edges 7–10 and the guiding edges 11–14. The cutting edges 7–10 and the guiding edges 11–14 extend along the cutting portion of the tool and also rotate circumferentially of the cutting portion to form a cylindrical helix. The tool is designed to be rotated about its major axis in the direction of arrow 24, as shown in FIGURE 1. As used in this application the term "helical" is used to describe a cutting edge or flute which progresses uniformly or non-uniformly around a cylindrical, conical or other surface in an axial direction. While the preferred embodiment shown comprises an end mill having a uniform effective diameter (e.g. diameter A) it will be readily appreciated by those versed in the art that the invention may be readily adapted to cutting tools having non-uniform diameters such as a conically-shaped angle cutter.

Referring to FIGURE 3, there is shown the geometry of a typical one of the novel guiding edges of the invention. The guiding edge 11 has a zero rake face 25 and a chamfered corner, the angle 19 of which is typically 45° (with respect to the face 25). The 5° clearance angle is indicated at 20.

Figure 5:
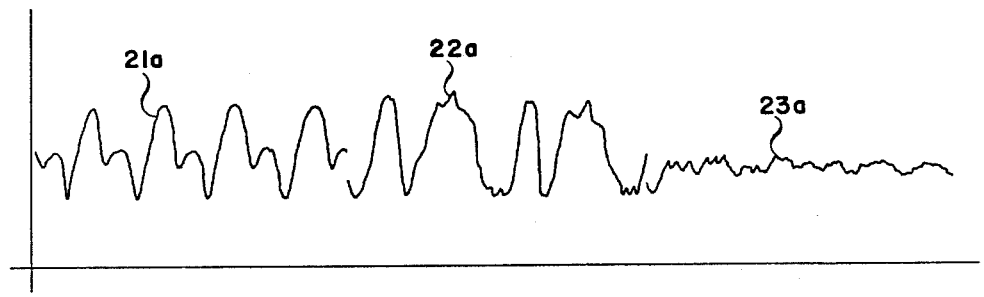
FIGURE 5 is a machine-plotted profile recording, graphically illustrating the end milled surface contours of the workpiece of FIGURE 4.

Referring to FIGURE 4, there is shown a single workpiece having three milled surface areas, each of which was cut with a different end mill. All cuts were made in the same plane. Surface portion 21 was produced by a standard four-flute end mill typical of the prior art. An electronically measured and recorded surface contour taken along a horizontal line is illustrated at 21a in FIGURE 5. The rippled or wave-like surface irregularity caused by the cyclical axial deflection of the tool is clearly evident.

The surface portion indicated at 22 in FIGURE 4 is produced by a standard two-flute end mill of the prior art. The corresponding surface contour recording is indicated at 22a in FIGURE 5. As can be seen, the amplitude of the surface irregularities is increased. The surface produced by the double land end mill of the present invention is indicated at surface portion 23 of FIGURE 4. The surface contour recording of surface 23 is indicated at 23a in FIGURE 5. As can be seen, there is a very substantial reduction in the amplitude of surface irregularities and a significant reduction in the pitch distance of the residual irregularities. The improvement in finish and accuracy is clearly evident. In the example shown and described, a feed rate of 0.004 inches per flute was used. Slight changes in dimensions would permit other desired feed rates.

In summary, the primary function of the non-cutting lands is to prevent deflection of the tool axis when there is a momentary force deflecting the tool into the workpiece. During rotation of the end mill, the helical cutting edges engage the material being machined. As the cutting continues the tool is forced away from the finished cut surface. However, just prior to the cutting edge disengaging the material being machined there would normally be a tendency for the longitudinal axis of the tool to deflect towards the machined surface as a result of the removal of the side load. However, before an appreciable deflection can occur the land carrying the guiding edge engages the machined surface and thereby prevents a side-ways deflection of the tool's longitudinal axis. In a sense, the second land acts as a bumper and temporarily absorbs the side load and also prevents adjacent cutting edges from cutting into the finished surface. As the tool continues to rotate the second land disengages the surface of the workpiece and the next land carrying a cutting edge commences to engage the surface of the workpiece.

The interposition of the stabilizing lands does not significantly increase the torque load of the driving device since it does not actually perform a metal cutting function. Thus, the practical loading effect is comparable to the torque load of a conventional four-flute mill.

Although the invention has been described in the preferred form with a certain degree of particularity, it is to be understood that the present disclosure of the preferred form has been made only by way of example and that numerous changes in the details of construction and the combination and arrangements of parts may be resorted to without departing from the spirit and scope of the invention as hereinafter claimed. For example, the number of flutes having cutting edges and the number of interposed lands carrying guiding edges may be increased or decreased in accordance with the requirements of particular applications. Also, the effective diameter of the cutter may be either uniform or non-uniform as dictated by the desired configuration of the cut and other obvious design desideratum.

By way of example only, there is tabulated below the dimensional parameters of various sizes of end mills having the geometry of the above-described four-flute embodiment.

TABLE

| Nominal diameter | Flute length | Overall length | A | B | C |
|---|---|---|---|---|---|
| ½ | 3 | 5 | { 0.5005<br>{ 0.5000 | 0.4950 }<br>0.4940 } | 0.312 |
| ¾ | 4½ | 6¾ | { 0.7505<br>{ 0.7500 | 0.7460 }<br>0.7450 } | 0.500 |
| 1 | 6 | 8½ | { 1.0010<br>{ 1.0000 | 0.9450 }<br>0.9440 } | 0.750 |
| 1¼ | 7½ | 9½ | { 1.2510<br>{ 1.2500 | 1.2450 }<br>1.2440 } | 0.875 |
| 1½ | 9 | 11½ | { 1.5010<br>{ 1.5000 | 1.4950 }<br>1.4940 } | 1.125 |

What is claimed is:
1. A rotary cutting tool comprising:
   a rotatable member having an arbor-engaging shank portion and a depending cutter portion;
   a cutting edge helically disposed along said cutter portion; and
   a guiding edge, helically disposed along said cutter portion, angularly spaced apart from said cutting edge and radially displaced from said cutting edge so as to have its path of rotation within the path of rotation of said cutting edge.

2. A rotary cutting tool as defined in claim 1 wherein said cutting edge and said guiding edge are axially coextensive over their length.

3. A rotary cutting tool as defined in claim 1 wherein said cutting edge is located at a first fixed radial distance from the axis of rotation of said rotatable member, and said guiding edge is located at a second fixed radial distance from said axis, said second radial distance being less than said first distance.

4. A rotary cutting tool as defined in claim 1 wherein said guiding edge is formed at the intersection of front and back converging faces, said back face having a clearance angle of approximately 7°.

5. A rotary cutting tool as defined in claim 1 wherein said guiding edge is formed with front and back converging faces and a chamfered surface therebetween.

6. A rotary cutting tool as defined in claim 4 wherein the angular spacing between the front face of said cutting edge and the front face of said guiding edge is in the range between approximately 30° to approximately 45°.

7. A double-land end mill comprising:
   a generally cylindrical fluted shaft adapted to be rotated in a given direction and having a fluted portion, the periphery of which defines a circumferential cutting path;
   a plurality of cutting edges helically disposed about the fluted portion of said shaft; and at least one helical non-cutting land coaxially interposed between said cutting edges and extending along the length of said fluted portion.

8. A double-land end mill as defined in claim 7 including:
a helically disposed clearing groove coaxially extending behind each of said cutting edges.

References Cited

UNITED STATES PATENTS 2,297,611  9/1942  Drummond _____ 29—103
3,374,518  3/1968  Bentjens _____ 29—103

HARRISON L. HINSON, Primary Examiner